(12) United States Patent
Plank et al.

(10) Patent No.: US 11,319,714 B2
(45) Date of Patent: May 3, 2022

(54) TELESCOPING FORMWORK SUPPORT WITH TWIST-PROOF REGION

(71) Applicant: DOKA GMBH, Amstetten (AT)

(72) Inventors: Anton Plank, Amstetten (AT); Gerald Burgstaller, Amstetten (AT); Erich Spreitzer, Ybbsitz (AT)

(73) Assignee: DOKA GMBH, Amstetten (AT)

( * ) Notice: Subject to any disclaimer, the term of this patent is extended or adjusted under 35 U.S.C. 154(b) by 0 days.

(21) Appl. No.: 17/082,980

(22) Filed: Oct. 28, 2020

(65) Prior Publication Data

US 2021/0123250 A1 Apr. 29, 2021

(30) Foreign Application Priority Data

Oct. 28, 2019 (EP) .................................. 19205726.3

(51) Int. Cl.
*E04G 11/56* (2006.01)
*E04G 25/06* (2006.01)

(52) U.S. Cl.
CPC ............ *E04G 11/56* (2013.01); *E04G 25/061* (2013.01); *E04G 25/065* (2013.01)

(58) Field of Classification Search
CPC ..... E04G 11/56; E04G 25/061; E04G 25/065; E04G 2025/042; E04G 11/48; E21D 15/24; F16B 7/14; F16B 7/182
See application file for complete search history.

(56) References Cited

U.S. PATENT DOCUMENTS

| | | | | |
|---|---|---|---|---|
| 8,616,519 B2 * | 12/2013 | Bacon | ..................... | E04G 25/00 249/18 |
| 2010/0005735 A1 * | 1/2010 | Gillespie | ................. | E04G 25/06 52/126.6 |

FOREIGN PATENT DOCUMENTS

| | | | | | |
|---|---|---|---|---|---|
| CA | 2450165 A1 | * | 10/2004 | ........... | E04G 25/061 |
| DE | 4230628 C1 | * | 7/1993 | ............ | E21D 15/24 |
| DE | 4329910 A1 | * | 3/1995 | ........... | E04G 11/483 |
| DE | 9421029 U1 | | 3/1995 | | |
| DE | 20122664 U1 | | 2/2007 | | |
| DE | 102012211384 A1 | | 1/2014 | | |
| DE | 102018125702 A1 | * | 4/2020 | ............. | E04G 7/307 |
| EP | 1195479 A2 | | 4/2002 | | |
| EP | 1273740 A2 | * | 1/2003 | ........... | E04G 25/061 |
| EP | 1975341 A1 | * | 10/2008 | ........... | E04G 25/061 |
| EP | 3438376 A1 | | 2/2019 | | |
| KR | 2011003998 A | | 4/2011 | | |
| KR | 20180107404 A | * | 10/2018 | ........... | E04G 25/061 |
| WO | 9213156 A1 | | 8/1992 | | |

(Continued)

Primary Examiner — Michael Safavi
(74) Attorney, Agent, or Firm — McCoy Russell LLP

(57) ABSTRACT

Formwork support comprising an outer support part and a telescopic inner support part, wherein the inner support part comprises a twist-proof portion and the outer support part comprises a twist-proof region with a first inner contour, wherein during telescoping of the inner support part, the twist-proof region of the outer support part cooperates with the twist-proof portion of the inner support part in such a manner that a twisting of the inner support part about its longitudinal axis with respect to the outer support part is blocked, wherein the outer support part comprises a guide region with a second inner contour which differs from the first inner contour for guiding the inner support part.

20 Claims, 7 Drawing Sheets

(56) References Cited

FOREIGN PATENT DOCUMENTS

| WO | WO-2012027351 A3 * | 3/2014 | ........... E04G 25/063 |
| WO | 2017055559 A1 | 4/2017 | |

* cited by examiner

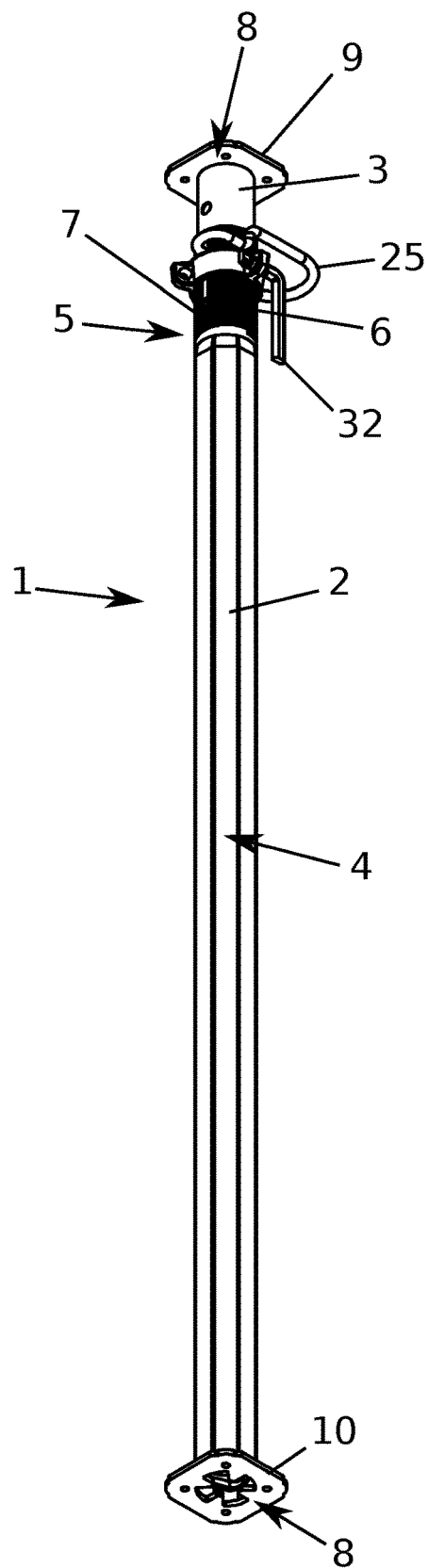
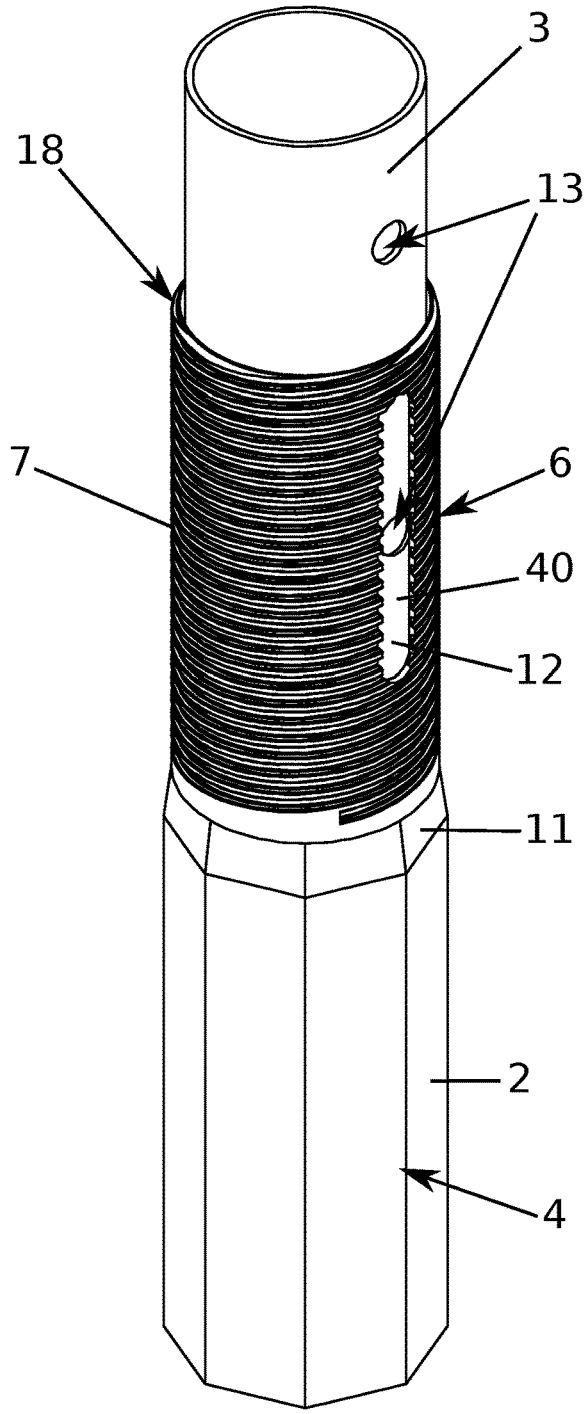
Fig.1
Fig.2

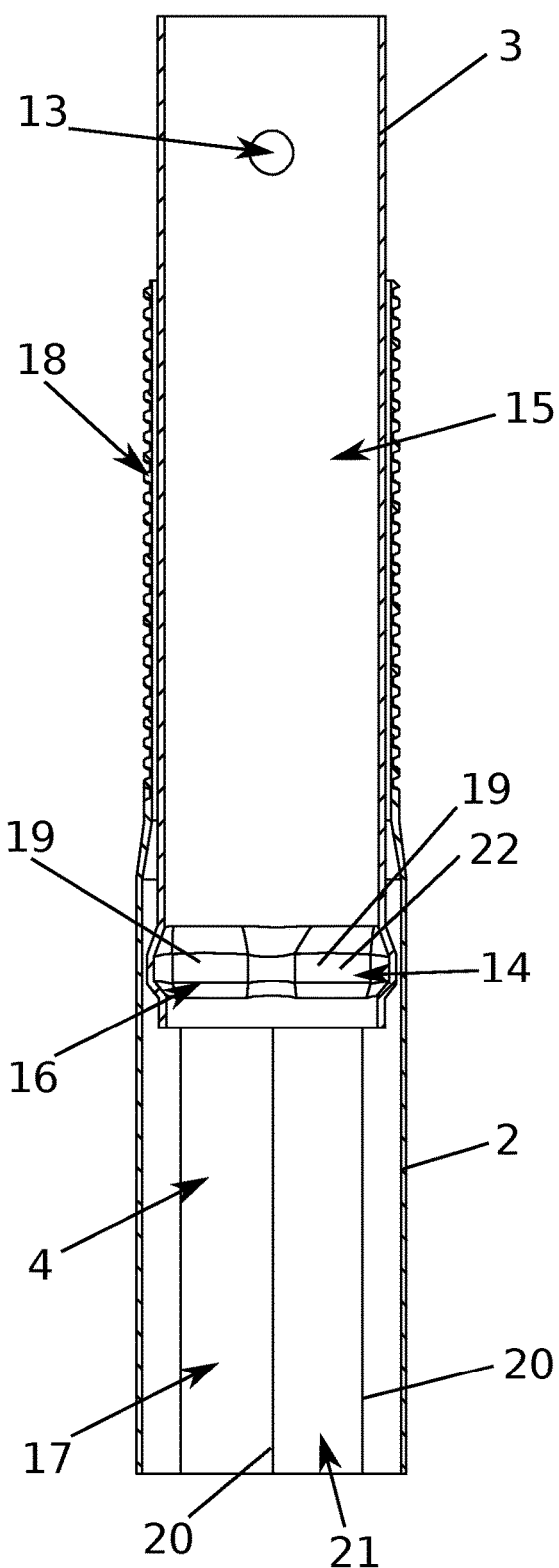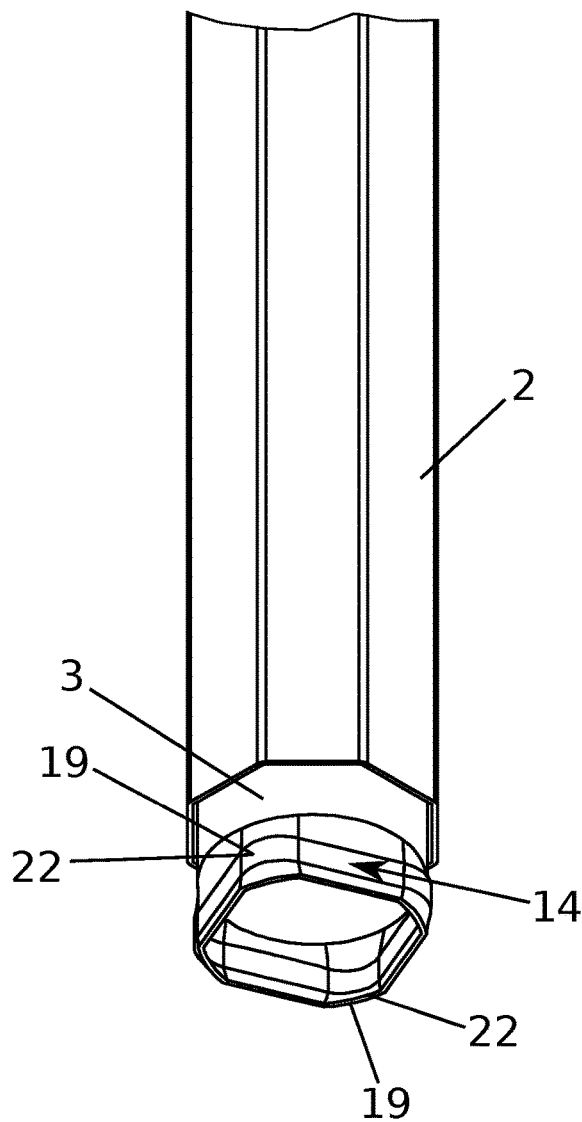
Fig.3
Fig.4

TELESCOPING FORMWORK SUPPORT WITH TWIST-PROOF REGION

CROSS-REFERENCE TO RELATED APPLICATION

The present application claims priority to European Patent Application No. 19205726.3 filed Oct. 28, 2019. The entire contents of the above-listed application is hereby incorporated by reference for all purposes.

TECHNICAL FIELD

The invention relates to a formwork support comprising an outer support part and a telescopic inner support part, wherein the inner support part comprises a twist-proof portion and the outer support part comprises a twist-proof region with a first inner contour, wherein during telescoping of the inner support part, the twist-proof region of the outer support part cooperates with the twist-proof portion of the inner support part in such a manner that a twisting of the inner support part about its longitudinal axis with respect to the outer support part is blocked.

The invention further relates to a ceiling formwork to produce a ceiling element having at least one formwork panel and at least one formwork support.

BACKGROUND AND SUMMARY

Formwork supports of the said type are used on building sites when producing ceilings. For this purpose the formwork supports are set up by means of a formwork plan and aligned onto one another. When aligning the formwork supports, particular care must be paid to their orientation with respect to one another. In particular, the support heads must be aligned parallel to the head ends of the formwork supports in order to enable the placement of transverse and longitudinal members as well as formwork panels in the next working step. After the ceiling formwork has been erected, concrete is poured onto the formwork panels. The applied loading of the concrete is led off downwards into the ground via the formwork supports.

DE 201 22 664 U1 discloses a formwork support. The formwork support comprises an outer and an inner support part which can be used to lengthen the formwork support. For locking the two support parts, the outer and the inner support part each have securing holes through which a securing bolt can be guided. However, in this prior art the support parts can be twisted with respect to one another during the telescoping.

A further formwork support is known from DE 94 21 029 U1. This formwork support also comprises an outer and an inner support part located therein, wherein pairs of holes with opposite securing holes through which a securing bolt can be guided are provided on both support parts for locking. Here also a twisting of the two support parts during telescoping is possible.

Furthermore a formwork support is known from DE 10 2012 211 384 A1 in which twistings of the inner support part with respect to the outer support part during telescoping are blocked. A disadvantage with the formwork support disclosed however is that the formwork support comprises a complex structure and therefore is expensive to produce.

In the case of formwork supports without an anti-twist device, much time is lost when setting up the formwork supports since in the telescoped position the support parts must be oriented with respect to one another in such a manner that the securing bolt can be guided through the securing holes of the inner and outer support part. At the same time, when setting up the formwork supports as already explained above, care must be taken to ensure that the head panels of the same row of formwork supports comprise the same orientation so that transverse and longitudinal members can be placed thereon subsequently. In the case of formwork supports without an anti-twist device, these work steps must be carried out by hand which is made additionally difficult by the high weight of the formwork supports.

On the other hand, known formwork supports with anti-twist devices have a comparatively complex structure compared to formwork supports without an anti-twist device which makes manufacture and handling difficult and increases the weight. However, easy-to-fabricate formwork supports which are easy to operate, which comprise a low susceptibility to error, which can withstand high loads and which comprise a low weight would be desirable.

It is therefore the object of the present invention to at least reduce or completely eliminate the disadvantages of the prior art. In particular, it is the object of the present invention to provide an easy-to-handle and easy-to-fabricate formwork support which facilitates the alignment and locking of the support parts with constructively simple means and which can be telescoped rapidly in a simple manner. This object is achieved by a formwork support of the type mentioned initially having the features of Claim 1. Preferred embodiments are specified in the dependent claims.

According to the invention, the outer support part comprises a guide region with a second inner contour which differs from the first inner contour for guiding the inner support part. Advantageously the telescoping of the formwork support is made easier by the guidance of the inner support part in the guide region. Expediently the guide region of the outer support part can in this case completely comprise the external circumference of the inner support part. For this purpose the second inner contour can be adapted to the outer contour of the inner support part and substantially correspond to this in shape and size. The second inner contour can differ from the first inner contour, for example, with regard to size and/or shape. Preferably the second inner contour is tapered with respect to the first inner contour. In addition to the guidance of the inner support part during telescoping, in the formwork support according to the invention as a result of the cooperation of the twist-proof portion and the twist-proof region, twistings (i.e. a rotation) of the inner support part with respect to the outer support part, are prevented preferably by tight fit. In other words, the inner and the outer support part of the formwork support according to the invention are always oriented in the same way with respect to one another and therefore always comprise the same rotational position with respect to one another when used as intended. The formwork support according to the invention is accordingly secured against twisting. As a result, the support parts can be locked more easily and in particular more rapidly with the result that the time expenditure when setting up the formwork supports is reduced. A particular advantage of always the same orientation of the inner and outer support part lies in that in the presence of securing holes, it is easier to guide the securing bolt through for locking. The twist-proof region of the outer support part is that region which by cooperating with the twist-proof portion of the inner support part blocks any twisting of the inner support part with respect to the outer support part but at the same time allows a translational displacement of the inner support part with respect to the outer support part in the longitudinal direction of the formwork support. Preferably the twist-proof region adjoins the guide region and merges into this. The guide region can in particular be arranged in an upper end region of the outer support part.

For the purposes of this disclosure the directional information such as "top", "bottom" and "outside" relates to the use of the formwork support as intended in which the formwork support stands on a contact area and longitudinal and transverse members can be placed on the formwork support "at the top". "Inwards" in this case means towards the longitudinal axis.

The twist-proof region of the outer support part according to the invention has a first inner contour which is different from the second inner contour. The first inner contour can, for example, have a polygonal shape. It can also be provided, for example, that the outer support part comprises an inwardly projecting twist-proof element in the twist-proof region, which cooperates with the twist-proof portion of the inner support part. In a preferred embodiment the inner contour in the entire twist-proof region is substantially the same. Preferably the inner contour in the entire guide region is substantially the same apart from some transition region to the twist-proof region. However, this need not necessarily be the case. It is important that the guide region comprises a second inner contour which differs from the first inner contour. The first inner contour should in this case block a twisting of the inner support part whilst the second inner contour allows the guidance of the inner support part. In this disclosure "inner contour" should be understood as the inner boundary of a cross-section. Accordingly, an outer contour designates the outer boundary of a cross-section. The first inner contour accordingly designates the inner boundary of a cross-section of the outer support part in the twist-proof region, possibly with some twist-proof elements. The second inner contour accordingly designates the inner boundary of a cross-section of the outer support part in the guide region. In order to save weight, the inner support part is preferably configured to be hollow. In addition, the inner support part can be formed in one piece, optionally with joining connections. The inner and the outer support part preferably consists of metal, even more preferably of steel. It is particularly preferred if the inner and the outer support part consist of different materials. It can also be provided that the outer support part comprises a region having a substantially circular inner contour and/or outer contour at the end opposite the guide region. As a result, the welding-on of a panel, in particular a floor panel, is made easier.

In one embodiment it can be provided that the inner support part comprises the twist-proof portion and a pull-out portion. The twist-proof portion can be connected to the pull-out portion and in particular merge into this portion. The pull-out portion and the twist-proof portion can be in one piece. The pull-out portion is in this case that portion which can be pulled out from the outer support part during telescoping and thereby lengthens the formwork support. However, the twist-proof portion and a part of the pull-out portion can remain in the outer support part even in the telescoped state for the purposes of stability and securing. In another embodiment it can be provided that the twist-proof portion extends substantially over the entire length of the inner support part. In relation to the guide region of the outer support part it can be provided that the second inner contour substantially corresponds to the outer contour of the inner support part, optionally the outer contour of the pull-out portion of the inner support part. Inter alia, the inner support part or the pull-out portion can comprise a substantially circular outer contour and the second inner part can accordingly also comprise a circular shape. The guide region can additionally comprise an outer contour which corresponds in shape to the second inner contour. The twist-proof region can also comprise an outer contour which corresponds to the shape of the first inner contour.

In a preferred embodiment it is provided that the second inner contour comprises a circular shape and is preferably tapered with respect to the first inner contour. "Tapered" means in this context that the area delimited by the second inner contour is smaller than the area delimited by the first inner contour. It is advantageous in this case if the shape of the second inner contour corresponds to the shape of the outer contour of the inner support part, in particular a pull-out portion. As a result of the tapered second inner contour with respect to the first inner contour, the ingress of foreign bodies into the interior of the formwork support can also advantageously be prevented.

In order to simplify the manufacture and handling, the twist-proof region and the guide region can be formed in one piece and in particularly merge smoothly into one another. In particular, the twist-proof region and the guide region can be produced from a single workpiece, optionally with joining connections. This can be accomplished in particular by forming a semi-finished product. Accordingly, the twist-proof region and the guide region are joined to one another without a joining connection. Smoothly means in this connection that a transition region between the guide region and the twist-proof region is inter alia free from projections, gradations and offsets.

In a preferred embodiment it is provided that the twist-proof portion comprises at least one twist-proof protuberance and the outer support part in the twist-proof region comprises at least one twist-proof depression, wherein during telescoping of the inner support part the twist-proof protuberance is displaceable along the twist-proof depression and blocks twisting of the inner support part about its longitudinal axis with respect to the outer support part. The twist-proof protuberance therefore cooperates with the twist-proof depression of the outer support part in such a manner that twistings about the longitudinal axis are blocked but translational movements in the longitudinal direction of the formwork support are made possible. The twist-proof protuberance can in particular slide in the twist-proof depression. The twist-proof protuberance preferably projects radially outwards from the inner support part. The twist-proof protuberance can inter alia be a pin, a corner, an edge or a bulge. The twist-proof depression is preferably configured to be elongate and oriented in the direction of the longitudinal axis of the formwork support. The twist-proof depression can be located on the inner side of the outer support part. The inner side of the outer support part is formed by the inner wall of the outer support part. The twist-proof depression is preferably curved outwards and can, for example, be formed by a groove or an edge. The number of twist-proof depressions is preferably at least as high as the number of twist-proof protuberances. During telescoping the twist-proof protuberance slides in the longitudinal direction of the formwork support in the twist-proof depression. As a result of the cooperation of the twist-proof protuberance with the twist-proof depression, preferably by tight fit, a twisting of the inner and outer support parts with respect to one another is blocked. In this case, naturally a small play can be provided in order to prevent wedging and facilitate telescoping. Alternatively, the arrangement can also be turned around, i.e. a twist-proof depression can be provided in the twist-proof portion and a twist-proof protuberance in the twist-proof region. In this alternative embodiment the twist-proof depression and the twist-proof protuberance are curved inwards and the twist-proof depression slides along the twist-proof protuberance during telescoping.

It is favourable if the first inner contour comprises an n-cornered, preferably a regularly n-cornered, in particular a hexagonal or octagonal cross-sectional shape and the twist-proof depressions are formed by the n corners of the first inner contour. The inner contour can be the same in the entire twist-proof region. The inner contour can be the same in the entire twist-proof region. Advantageously the outer support part can be approximated by the n-cornered shape of a circular shape which has a favourable effect on the stability of the entire formwork support. Here "n" is a natural number and designates the number of corners. The corners here form twist-proof depressions which are delimited by the edges connecting the corners. The first inner contour designates, as mentioned, the inner contour of the cross-section of the outer support part, i.e. the contour of the inner side or inner wall of the outer support part. In the twist-proof region the shape of the outer wall/outer contour can substantially correspond to the shape of the inner wall/inner contour.

For this purpose it is favourable if the twist-proof portion of the inner support part comprises an n-cornered, preferably a regular n-cornered, in particular a substantially square outer profile and the n corners of the outer contour when viewed in cross-section each form a twist-proof protuberance, wherein the corners are preferably rounded. "n" again designates a natural number and designates the number of corners. The number of corners of the twist-proof portion can, however, be different from the number of corners of the twist-proof region. In this embodiment therefore n twist-proof protuberances are obtained, wherein for each twist-proof protuberance at least one corresponding twist-proof depression can be provided. The outer contour of the twist-proof portion designates the outer contour of the cross-section of the twist-proof portion. The outer contour can be the same in the entire twist-proof portion.

The outer support part preferably has a length of at least 80 cm, in particular at least 80.8 cm, 135.6 cm, 160.6 cm, 185.6 cm, 210.6 cm, 238.5 cm, 285.6 cm or 370.6 cm. The inner support part preferably has a length of at least 90 cm, in particular at least 90.9 cm, 145.7 cm, 170.7 cm, 195.7 cm, 220.7 cm, 245.7 cm, 295.7 cm or 380.7 cm.

In order that a large part of the length of the inner support part can be utilized during telescoping, it is advantageous if the twist-proof portion is provided on an end region of the inner support part. In this case, the twist-proof portion can form the termination, i.e. the end of the inner support part. The end region of the inner support part on which the twist-proof portion is provided is that which remains in the outer support part during telescoping and is not pulled out.

In a preferred position it is provided that the twist-proof region extends over the distance covered by the twist-proof portion between a completely telescoped and a completely inserted position of the inner support part. The completely inserted position is in this case that position in which the inner support part is inserted the furthest into the outer support part, in particular substantially completely. The completely telescoped position is in this case a position in which the inner support part is pulled out from the outer support part to lengthen the formwork support but is still located at least partially in the outer support part in order not to impair the function of the formwork support.

Preferably the largest external diameter of the twist-proof portion substantially corresponds to the largest internal diameter of the twist-proof region. The external diameter of the twist-proof portion here relates to its cross-section. Usually the largest external diameter corresponds to the longest diagonal. If, for example, the twist-proof portion has a square outer contour, the largest external diameter is the diagonal of the square. In the case of an n-gon, the largest external diameter would be the longest diagonal between two corners. The same applies to the largest internal diameter of the twist-proof region which relates to the cross-section of the outer support part, more precisely to its inner side or the first inner contour.

In order to block a complete withdrawal of the inner support part, the inner support part can have a pull-out portion and the guide region can comprise an internal diameter which substantially corresponds to the largest external diameter of the pull-out portion. Expediently in this case the largest external diameter of the twist-proof portion is greater than the largest external diameter of the pull-out portion. Consequently the twist-proof portion cannot be pushed through the guide region. The diameters again relate to the cross-sections of the respective elements. The guide region blocks any pulling-out of the twist-proof portion. Preferably the guide region comprises a substantially circular inner contour.

If a pull-out portion is provided, this can comprise a substantially circular outer contour in order to simplify the manufacture of the inner support part and increase the stability of the formwork support overall. The outer contour of the pull-out portion designates the outer contour of the cross-section of the pull-out portion. The outer contour of the pull-out portion is preferably the same along its entire longitudinal extension. In a preferred embodiment the pull-out portion is formed by a round tube or a hollow cylinder. Alternatively however, a solid cylinder can also be provided.

In a preferred embodiment it is provided that the inner support part comprises at least one securing hole and the outer support part preferably in the guide region comprises at least one retaining recess, in particular a retaining elongate hole, wherein a telescoped position of the formwork support exists in which the securing hole and the at least one retaining recess lie above one another in such a manner that a securing bolt can be guided simultaneously through the securing hole and the retaining recess. It is advantageous if a plurality of securing holes are arranged at regular intervals along a straight line along the longitudinal direction of the inner support part. If a pull-out portion is provided, the securing hole is preferably provided in this. In particular, if the inner support part is hollow, a plurality of pairs of holes can be provided each comprising two opposite securing holes. Preferably the pull-out portion is configured as a tube which comprises a plurality of pairs of holes each comprising two opposite securing holes, through which the securing bolt can be guided transversely to the longitudinal direction of the inner support part from one side of the tube to the other. The outer support part preferably also comprises a pair of holes with two retaining holes arranged on opposite longitudinal sides of the outer support part, in particular retaining elongate holes. In the presence of pairs of holes on the inner support part, these are advantageously oriented along the longitudinal axis of the inner support part in such a manner that these slide past the retaining elongate holes during telescoping of the formwork support so that the securing bolt can be guided simultaneously through the inner and outer support part.

In order to lock the formwork support, the outer support part in the region of the at least one retaining recess can be provided with a securing bolt which can be guided through the at least one retaining recess and the at least one securing hole. Preferably the securing bolt comprises two opposite U-shaped portions having different radii of curvature. The U-shaped portion having the smaller radius of curvature comprises a securing leg which can be guided through the at least one retaining recess and the at least one securing hole and thus locks the formwork support. With the U-shaped portion having the larger radius of curvature, an undesired removal of the securing bolt from the formwork support can be prevented. If the outer support part comprises a pair of retaining elongate holes, the securing bolt is displaceable therein in the longitudinal direction of the formwork support.

For fine adjustment of the formwork support in the locked state, the outer support part can comprise an external thread with a nut in an end region. Preferably the external thread is located in the guide region. The nut is a so-called retainer nut. If at least one region of the retaining elongate hole is arranged inside the external thread, a securing bolt displaceable therein can be displaced by twisting the nut in the longitudinal direction of the formwork support. In this case, the securing bolt is introduced into the retaining elongate hole and applies load to the nut. In order to prevent an unintentional twisting, the nut can comprise a securing element which blocks a twisting of the nut.

The object according to the invention is additionally solved by a ceiling formwork of the type mentioned initially in which the at least one formwork support is implemented as described above.

BRIEF DESCRIPTION OF THE FIGURES

In the following, preferred embodiments of the formwork support according to the invention and the ceiling formwork according to the invention are described in detail with reference to figures to which the invention should not however be restricted.

FIG. 1 shows one embodiment of a formwork support according to the invention.

FIG. 2 shows a part of a formwork support according to the invention.

FIG. 3 shows a longitudinal section of the part according to FIG. 2.

FIG. 4 shows a lower end region of a formwork support according to the invention.

DETAILED DESCRIPTION

Figure 5:
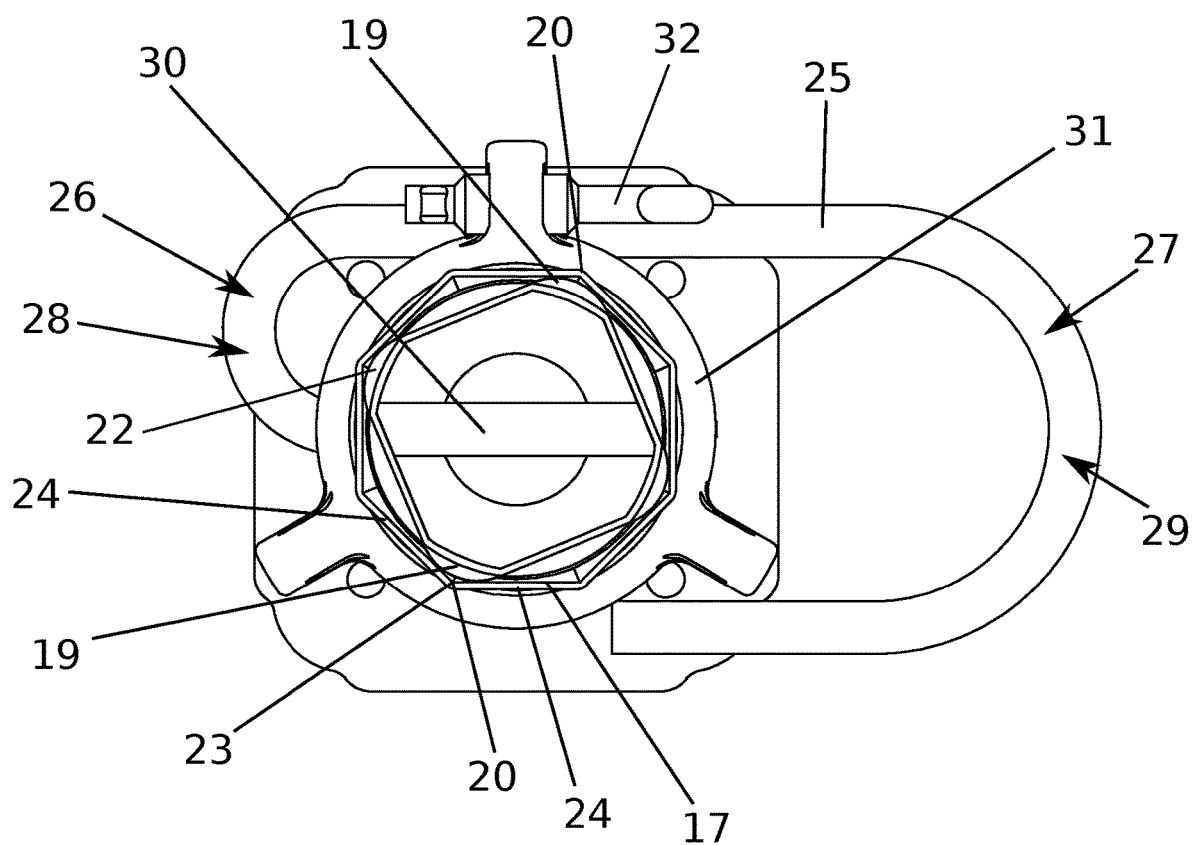
FIG. 5 shows a cross-section of the formwork support in an upper end region.

FIG. 1 shows a formwork support 1 according to the invention comprising an outer support part 2 and an inner support part 3 arranged therein. In order to adapt the length of the formwork support 1, the inner support part 3 can be pulled out, i.e. telescoped, from the outer support part 2.

Thus, the formwork support 1 can be brought from a completely inserted position into a completely telescoped position.

In the embodiment shown the outer support part 2 comprises a twist-proof region 4 having an octagonal outer contour and in an upper end region 5 a guide region 6 having a substantially circular outer contour for guiding the inner support part 3. The outer contour of the guide region 6 is tapered with respect to the outer contour of the twist-proof region 4 and has an external thread 7. Located at both ends of the formwork support 1 are panels 8, namely a head panel 9 and a bottom panel 10. The bottom panel 10 is connected to a lower end of the outer support part 2 opposite the guide region 6. The head plate 9 is connected to an end of the inner support part 3 which projects from the guide region 6.

As can be seen more precisely in FIG. 2, substantially the entire guide region 6 is surrounded on the outer side by the external thread 7. The external thread 7 can, for example, be milled in or imprinted. The guide region 6 having the substantially circular outer contour merges into the twist-proof region 4 having the octagonal outer contour, preferably without joining connections and in particular smoothly. The guide region 6 and the twist-proof region 4 can in particular have been produced in one piece, i.e. from a single workpiece. It can be seen that the guide region 6 comprises a reduced external diameter compared to the twist-proof region 4. The transition region 11 between the twist-proof region 4 and the guide region 6 is conically tapering.

It can be further identified in FIG. 2 that a retaining recess 40 in the form of a retaining elongate hole 12 is provided in the guide region 6, inside the external thread 7. A further retaining elongate hole 12 of the same type (not visible) is provided opposite the retaining elongate hole 12, i.e. on the other side of the guide region 6. The two retaining elongate holes 12 together form a pair of retaining elongate holes. For locking the formwork support 1 the inner support part 3 comprises a plurality of securing holes 13. Two securing holes 13 located on opposite sides of the inner support part 3 again form a pair of holes. On the inner support part 3 a plurality of such pairs of holes are arranged along a straight line. With the aid of the securing holes 13, the retaining elongate holes 12 and a securing bolt (not shown), it is possible to lock the formwork support 1 in a telescoped position, wherein however displacements of the securing bolt within the retaining elongate holes 11 are possible. For locking the formwork support 1 is brought into a position in which the retaining elongate holes 12 lie above a pair of holes comprising two securing holes 13 and thus the securing bolt can be guided through the retaining elongate holes 12 and securing holes 13. In order to perform a fine adjustment during locking, a retaining nut 31 (see FIG. 5) can be provided on which the securing bolt can rest and which comprises an internal thread which engages in the external thread 7. By twisting the retaining nut 31, the position of the securing bolt in the retaining elongate holes 12 can be varied. The procedure during locking is explained further below with reference to FIG. 5.

FIG. 3 shows a part of the formwork support 1 in longitudinal section. Here it can be seen that in the embodiment shown the inner support part 3 comprises a twist-proof portion 14 and a pull-out portion 15. The twist-proof portion 14 is provided in an end region 16 of the inner support part 3. In the diagram shown the pull-out portion 15 is formed by a hollow round tube and accordingly comprises a substantially circular outer contour over its entire longitudinal extension. The pull-out portion 15 is that portion which can be guided through the guide region 6 and thus lengthens the formwork support 3 during telescoping. In the embodiment shown, a part of the pull-out portion 15 is always covered by the guide region 6 since the twist-proof portion 14 on account of its size cannot be guided through the guide region 6. In FIG. 2 and FIG. 3 it can also be seen that the twist-proof region 4 has a first inner contour 17 and the guide region 6 comprises a second inner contour 18 (covered by the inner support part 2) which differs from the first outer contour 17, wherein the second inner contour 18 is preferably tapered, i.e. smaller, with respect to the first inner contour 17. Compared with the twist-proof region 4, the guide region 6 thus comprises a smaller internal diameter. In this embodiment, the internal diameter is the same in each case in the entire guide region 6 and in the entire twist-proof region 4. However, this need not necessarily be the case. It is important that the guide region 6 comprises a second inner contour 18 which differs from the first inner contour 17. The first inner contour 17 should in this case block any twisting of the inner support part whilst the second inner contour 18 enables the guidance of the inner support part 3. The first inner contour 17 of the twist-proof region 4 comprises an octagonal shape like its outer contour. The second inner contour 18 of the guide region 6 comprises a substantially circular shape like its outer contour. The internal diameter of the guide region 6 substantially corresponds to the largest external diameter of the pull-out portion 15, wherein a small play can be provided between the pull-out portion 15 and the guide region 6.

The twist-proof portion 14 is adapted to block any twisting of the inner support part 3 with respect to the outer support part 2 but to allow translational displacements of the inner support part 3 with respect to the outer support part 2 in the longitudinal direction of the formwork support 1. For this purpose the twist-proof portion 14 comprises a plurality of twist-proof protuberances 19, in the exemplary embodiment shown, four. The twist-proof protuberances 19 slide in the elongate twist-proof depressions 20 on an inner side 21 of the outer support part 2 in the twist-proof region 4, wherein the twist-proof depressions 20 are oriented in the longitudinal direction of the formwork support 1. The inner side 21 is formed by the inner wall of the outer support part 2.

As can be seen in particular from FIG. 4, the outer contour of the twist-proof portion 14 comprises the shape of a square with rounded corners 22, wherein the corners 22 form the twist-proof protuberances 19. The largest diameter of the twist-proof portion 14, in the case shown the diagonal of the square of the outer contour is larger than the diameter of the cross-section of the pull-out portion 15. As a result, the twist-proofing is exclusively achieved by the twist-proof portion 14.

As shown in the view in FIG. 5, the outer support part 2 in the twist-proof portion 4 not only has a regular octagonal outer contour but also a regular octagonal first inner contour 17. The corners 23 of the first inner contour 17 in this case, when viewed in cross-section, form the twist-proof depressions 20. The twist-proof protuberances 19 slide in the longitudinal direction in the twist-proof depressions 20 which extend substantially over the entire outer support part 2 apart from the guide region 6. The twist-proof portion 14 is in this case dimensioned in terms of size in such a manner that the twist-proof protuberances 19, when viewed in cross-section, are blocked in the event of twistings of the inner support part 3 by the edges 24 connecting the corners 23 of the outer support part 2 and forming the corners 23. The largest external diameter of the twist-proof portion 14 advantageously substantially corresponds to the largest internal diameter of the twist-proof region 4 of the outer support part 2. Thus, the corners 22 of the twist-proof portion 14 lie in the corners 23 of the outer support part 2 and are in this case secured against twistings by the edges 24.

The twist-proof depressions 20 extend in the exemplary embodiment shown from the end of the outer support part 2 opposite the guide region 6 to the guide region 6. In order to prevent a complete withdrawal of the inner support part 3 on one side of the formwork support 1, the guide region 6 or the second inner contour 18 comprises a smaller internal diameter than the largest external diameter of the twist-proof portion 14. On the other side of the formwork support 1, the bottom plate 10 prevents a withdrawal of the inner support part 3.

In order to lock the inner support part 3 in a telescoped position, in the depicted formwork support 1 according to FIG. 5 a securing bolt 25 is provided. The securing bolt 25 shown has two opposite U-shaped sections 26, 27 having different radii of curvature. The U-shaped section 26 having the smaller radius of curvature in this case comprises a securing section 28 whilst the U-shaped section 27 having the larger radius of curvature comprises a grip section 29. A leg 30 of the securing section 28 is adapted to be guided through the retaining elongate holes 12 and the securing holes 13 and lock the formwork support 1. This leg 30 of the securing section 28 thus forms the "actual" securing bolt. The displacement of the securing bolt 25 is facilitated with the grip section 29. The securing bolt 25 is displaceable in the retaining elongate holes 12 in the longitudinal direction.

In order to adjust the formwork support 1 in height, a retaining nut 31 can be provided. The retaining nut 31 comprises an internal thread (not shown) and is arranged on the external thread 7 and can be moved up and down by twisting on this in the longitudinal direction of the formwork support 1. When the securing bolt 25 is introduced into the retaining elongate holes 12 which are arranged in the external thread 7, this can apply load to the retaining nut 31. By twisting the retaining nut 31, the securing bolt 25 is displaced in the longitudinal direction of the elongate holes 12. When the formwork support 1 is loaded, the force is transferred from the inner support part 3 via the securing bolt 25 and the retaining nut 31 to the outer support part 2. In order to fix the retaining nut 31, this can comprise a securing element 32 which prevents any twisting of the retaining nut 31 when activated.

Figure 6A:
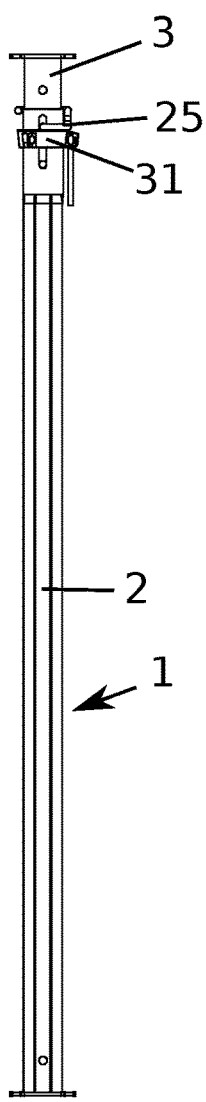
FIG. 6A, FIG. 6B, and FIG. 6C each show different positions of a formwork support according to the invention.
Figure 6B:
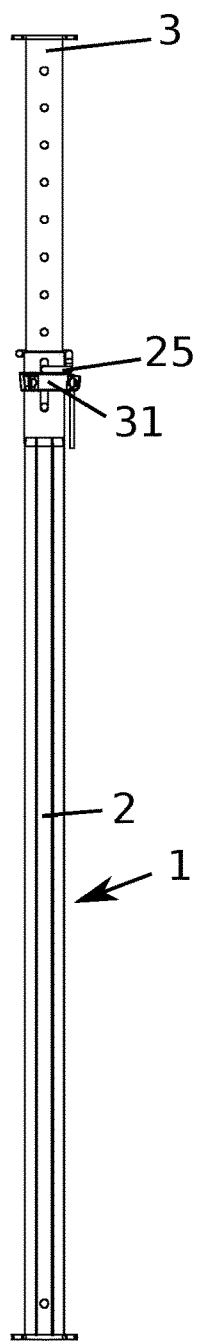
Figure 6C:
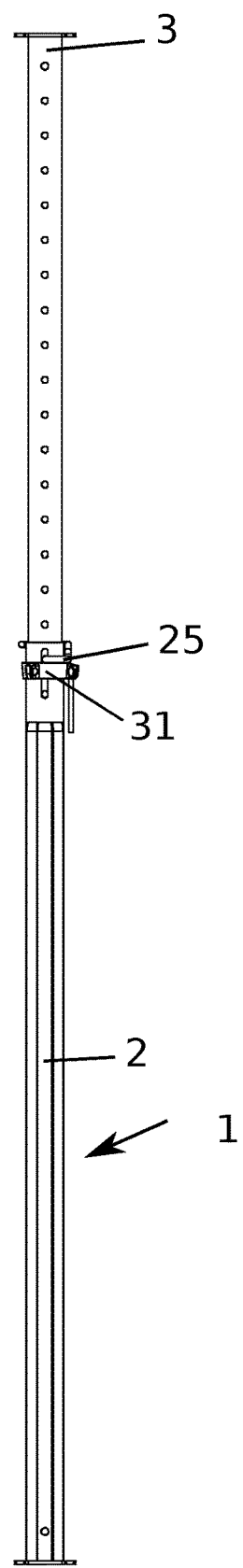

FIG. 6A, FIG. 6B, and FIG. 6C show the formwork support 1 in different positions wherein in FIG. 6A the inner support part 3 is inserted the furthest into the outer support part 2. The formwork support 1 could be inserted even further by twisting the retaining nut 31 or removing the securing bolt 25. FIG. 6B shows a further extended position of the formwork support 1. FIG. 6C shows an even further extended position. In the position according to FIG. 6C a further extension would no longer be possible since the twist-proof portion 14 is already situated at the guide region 6.

Figure 7:
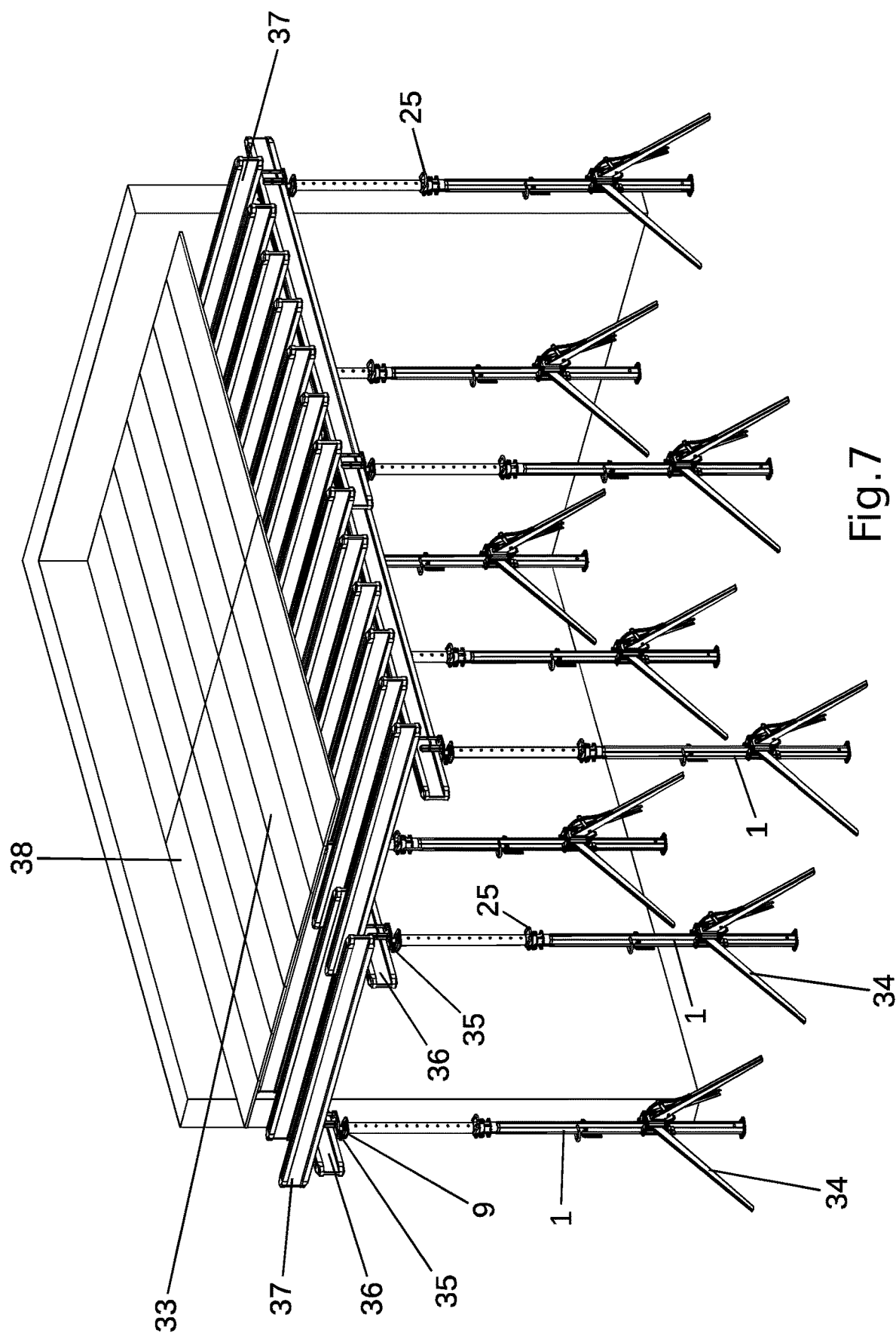
FIG. 7 shows a ceiling formwork according to the invention with a plurality of formwork supports of the same type.

FIG. 7 shows a ceiling formwork 33 according to the invention comprising a plurality of formwork supports 1 of the same kind. The formwork supports 1 are arranged in rows parallel to one another and each have a foldable tripod 34 in the lower region for stabilization and alignment. Clamps 35 are provided on the head panels 9 of the formwork supports 1 which secure longitudinal members 36 in the form of I beams. Transverse members 37 apply loads to the longitudinal members 36 at right angles so that the load of the concrete to be poured subsequently (not shown)

is removed uniformly. Finally formwork panels 38 are located on the transverse members 37, onto which the concrete is poured to produce a ceiling element.

Figure 8:
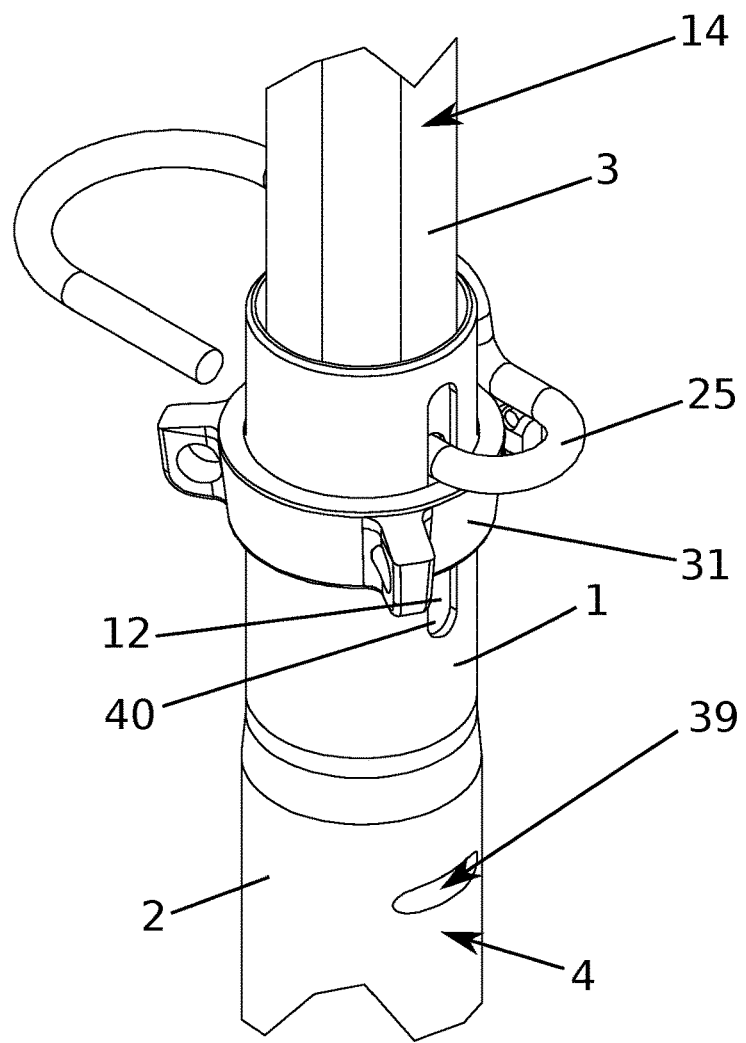
FIG. 8 shows an alternative embodiment of the formwork support according to the invention in a side view.

FIG. 8 shows an alternative embodiment of the formwork support 1. The thread 7 is not shown. In this embodiment, the inner support part 3 is formed by an n-cornered tube. The twist-proof portion 14 of the inner support part 3 extends in this embodiment substantially over the entire length of the inner support part 3. The twist-proof region 4 of the outer support part 2 comprises a twist-proof element 39 in the form of a depression which projects inwards from the outer support part 2. The twist-proof element 39 cooperates with the twist-proof portion 14 of the inner support part 3 in such a manner that during telescoping a twisting of the inner support part 3 is blocked by tight fit. The first inner contour 17 is here defined by the inner wall of the outer support part 2 and the twist-proof elements 39 and differs from the second inner contour 18 of the guide region. The second inner contour 18 is substantially circular, as in the first embodiment.

Figure 9:
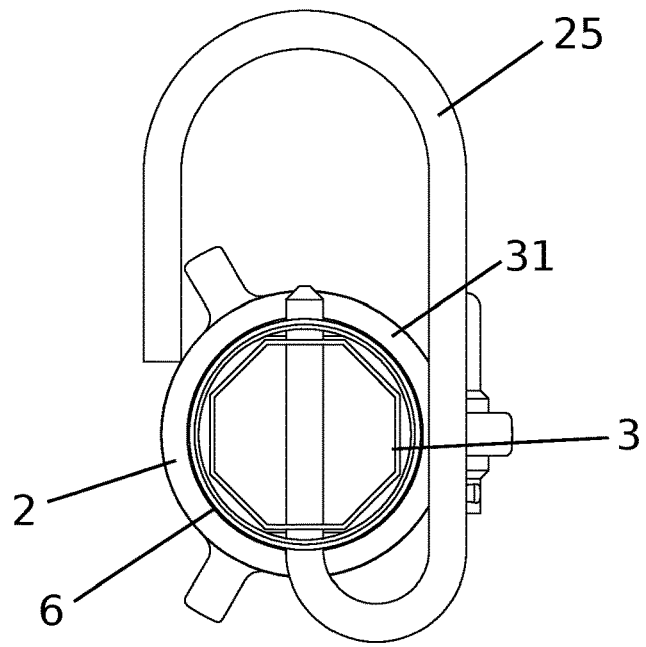
FIG. 9 shows the alternative embodiment of the formwork support according to the invention in a view from above.

FIG. 9 shows the formwork support 1 in the alternative embodiment viewed from above.

Figure 10:
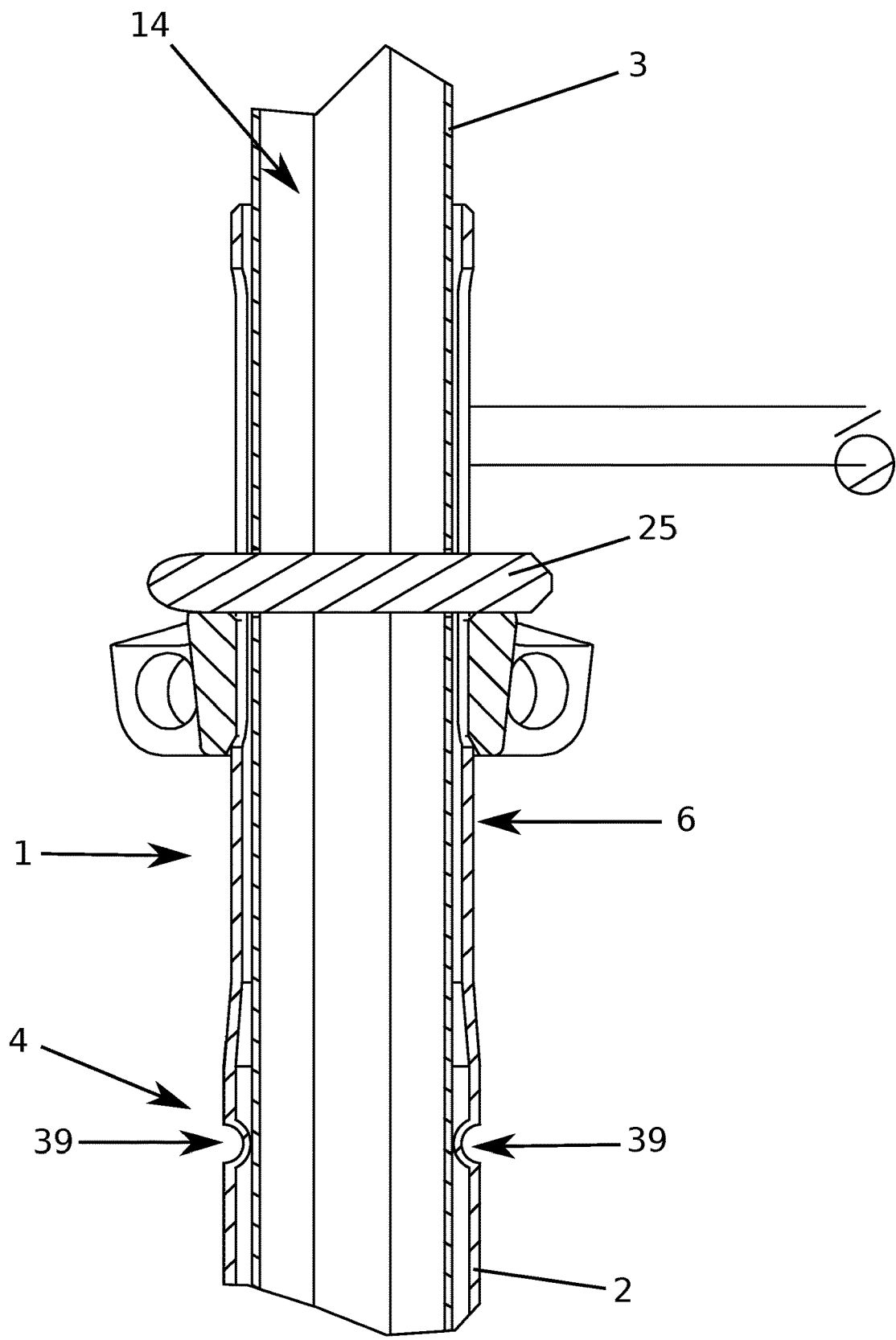
FIG. 10 shows a longitudinal section of the formwork support according to FIG. 8.

FIG. 10 shows a longitudinal section of the embodiment according to FIG. 8.

The invention claimed is:

1. A formwork support comprising an outer support part and a telescopic inner support part, wherein the inner support part comprises a twist-proof portion and the outer support part comprises a twist-proof region with a first inner contour, wherein during telescoping of the inner support part, the twist-proof region of the outer support part cooperates with the twist-proof portion of the inner support part in such a manner that a twisting of the inner support part about its longitudinal axis with respect to the outer support part is blocked, wherein the outer support part comprises a guide region with a second inner contour which differs from the first inner contour for guiding the inner support part, wherein the twist-proof region and the guide region are formed in one piece, wherein the outer support part comprises a tapering transition region between the twist-proof region and the guide region so that an area delimited by the second inner contour is smaller than an area delimited by the first inner contour.

2. The formwork support according to claim 1, wherein the second inner contour comprises a circular shape.

3. The formwork support according to claim 1, wherein the twist-proof portion comprises at least one twist-proof protuberance and the outer support part in the twist-proof region comprises a twist-proof depression, wherein during telescoping of the inner support part the twist-proof protuberance is displaceable along the twist-proof depression and blocks twisting of the inner support part about its longitudinal axis with respect to the outer support part.

4. The formwork support according to claim 3, wherein the first inner contour comprises an n-cornered cross-sectional shape with n corners, wherein the twist-proof depressions are formed by the n corners of the first inner contour.

5. The formwork support according to claim 4, wherein the twist-proof portion of the inner support part comprises an n-cornered outer contour with n corners, wherein the n corners of the outer contour each form a twist-proof protuberance.

6. The formwork support according to claim 1, wherein the twist-proof portion is provided on an end region of the inner support part.

7. The formwork support according to claim 6, wherein the twist-proof region extends over the distance covered by the twist-proof portion between a completely telescoped and a completely inserted position of the inner support part.

8. The formwork support according to claim 1, wherein the largest external diameter of the twist-proof portion substantially corresponds to the largest internal diameter of the twist-proof region.

9. The formwork support according to claim 8, wherein the inner support part comprises a pull-out portion and the guide region comprises a smallest internal diameter which substantially corresponds to the largest external diameter of the pull-out portion.

10. The formwork support according to claim 1, wherein the inner support part comprises at least one securing hole and the outer support part comprises at least one retaining recess, wherein a telescoped position of the formwork support exists in which the at least one securing hole and the retaining recess lie above one another in such a manner that a securing bolt can be guided simultaneously through the at least one securing hole and the retaining recess.

11. The formwork support according to claim 10, wherein the outer support part in the region of the at least one retaining recess comprises the securing bolt which can be guided through the retaining recess and the at least one securing hole.

12. The formwork support according to claim 11, wherein the securing bolt comprises two opposite U-shaped portions having different radii of curvature, wherein the U-shaped portion having the larger radius of curvature represents a gripping portion and the U-shaped portion having the smaller radius of curvature represents a securing portion, wherein the securing portion comprises a leg which can be inserted into the retaining recess and the securing hole.

13. The formwork support according to claim 1, wherein in an end region, the outer support part comprises an external thread with a nut.

14. A ceiling formwork for producing a ceiling element having at least one formwork panel and at least one formwork support, wherein the at least one formwork support is formed according to claim 1.

15. The formwork support according to claim 1, wherein the twist-proof region and the guide region merge into one another smoothly.

16. The formwork support according to claim 4, wherein the first inner contour comprises a regularly n-cornered cross-sectional shape.

17. The formwork support according to claim 5, wherein the outer contour is regularly n-cornered.

18. The formwork support according to claim 10, wherein the retaining recess is disposed in the guide region.

19. The formwork according to claim 10, wherein the least one retaining recess is a retaining elongate hole.

20. The formwork according to claim 13, wherein the external thread with the nut is disposed in the guide region.

* * * * *